United States Patent
Barhudarian et al.

(10) Patent No.: US 11,296,881 B2
(45) Date of Patent: Apr. 5, 2022

(54) USING IP HEURISTICS TO PROTECT ACCESS TOKENS FROM THEFT AND REPLAY

(71) Applicant: MICROSOFT TECHNOLOGY LICENSING, LLC, Redmond, WA (US)

(72) Inventors: Violet Anna Barhudarian, Kirkland, WA (US); Jiangfeng Lu, Bothell, WA (US); Caleb Geoffrey Baker, Seattle, WA (US); Oren Jordan Melzer, Redmond, WA (US); Anirban Basu, Sammamish, WA (US); Praveen Erode Murugesan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 16/668,373

(22) Filed: Oct. 30, 2019

(65) Prior Publication Data

US 2021/0135869 A1    May 6, 2021

(51) Int. Cl.
*H04L 9/32* (2006.01)
*H04L 9/08* (2006.01)

(52) U.S. Cl.
CPC ............ *H04L 9/3213* (2013.01); *H04L 9/088* (2013.01); *H04L 9/0866* (2013.01); *H04L 9/3228* (2013.01)

(58) Field of Classification Search
CPC ..... H04L 9/0866; H04L 63/10; H04L 9/3213; H04L 9/0891; H04L 9/3228; H04L 9/088; G06F 21/62
See application file for complete search history.

(56) References Cited

U.S. PATENT DOCUMENTS

| | | | |
|---|---|---|---|
| 2008/0318548 A1* | 12/2008 | Bravo | H04L 63/0853 455/411 |
| 2009/0031131 A1* | 1/2009 | Qiu | H04L 9/006 713/172 |
| 2011/0067086 A1 | 3/2011 | Nachenberg et al. | |
| 2015/0089621 A1 | 3/2015 | Khalid et al. | |
| 2016/0285850 A1* | 9/2016 | Yang | H04L 63/1416 |
| 2018/0205742 A1* | 7/2018 | Vinukonda | H04L 63/107 |
| 2018/0278584 A1* | 9/2018 | Kuperman | H04L 9/3236 |
| 2018/0332016 A1* | 11/2018 | Pandey | H04L 63/108 |

OTHER PUBLICATIONS

"OAuth—Wikipedia", Retrieved :https://en.wikipedia.org/w/index.php?title=OAuth&oldid=921887306, Oct. 18, 2019, 8 Pages.
"International Search Report and Written Opinion Issued in PCT Application No. PCT/US20/056739", dated Mar. 11, 2021, 11 Pages.

* cited by examiner

*Primary Examiner* — Mohammad A Siddiqi
(74) *Attorney, Agent, or Firm* — Workman Nydegger

(57) ABSTRACT

An embodiment disclosed herein is related to computing systems and method for a computing system to generate an access token that includes an IP address from a request. In the embodiment, a request is received for access to one secured data items. The request may include user credentials that specify that a user making the request is permitted to access the secured data items. The user credentials are validated and an Internet Protocol (IP) address that the request was sent from is determined. An access token is generated that includes the IP address that the request was sent from.

17 Claims, 7 Drawing Sheets

USING IP HEURISTICS TO PROTECT ACCESS TOKENS FROM THEFT AND REPLAY

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. Computer systems have been coupled to one another and to other electronic devices to form both wired and wireless computer networks over which the computer systems and other electronic devices can transfer electronic data. As such, the performance of many computing tasks has become distributed across a number of different computer systems and/or a number of different computer environments.

For example, one computing device may request to access secured data stored on a secured server. To ensure that the secured data remains secure, the secured server may require that the requesting computing device provide an access token or the like that validates that the requesting device is permitted to access the secured data. This access token may be obtained by the requesting computing device from an identity provider and then provided to the secure server. If the secure server accepts the access token, the requesting computing device may be given access to the secured data.

Unfortunately, however, it is possible that an access token may be stolen by a token thief, who is then able to use the token in place of the requesting computing device. Thus, improved security measures are needed to protect access tokens from being stolen.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An embodiment disclosed herein is related to computing systems and method for a computing system to generate an access token that includes an IP address from a request. In the embodiment, a request is received for access to one secured data items. The request may include user credentials that specify that a user making the request is permitted to access the secured data items. The user credentials are validated and an Internet Protocol (IP) address that the request was sent from is determined. An access token is generated that includes the IP address that the request was sent from.

An alternative embodiment herein is related to computing systems and method for a computing system to compare an IP address included in an access token to the IP address that the access token was sent from. An access token is received that includes a first Internet Protocol (IP) address. The access token causes the computing system to provide access to secured data items that are stored at the computing system. The first IP address included in the access token is compared with a second IP address that the access token was sent from. Access to the secured data items is provided if the first and second IP addresses match. The access token is rejected, and access is denied if the first and second IP addresses do not match.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope. Embodiments will be described and explained with additional specificity and details through the use of the accompanying drawings in which:

FIG. 4 illustrates a flowchart of a method for a computing system to compare an IP address included in an access token to the IP address that the access token was sent from.

DETAILED DESCRIPTION

Figure 1:
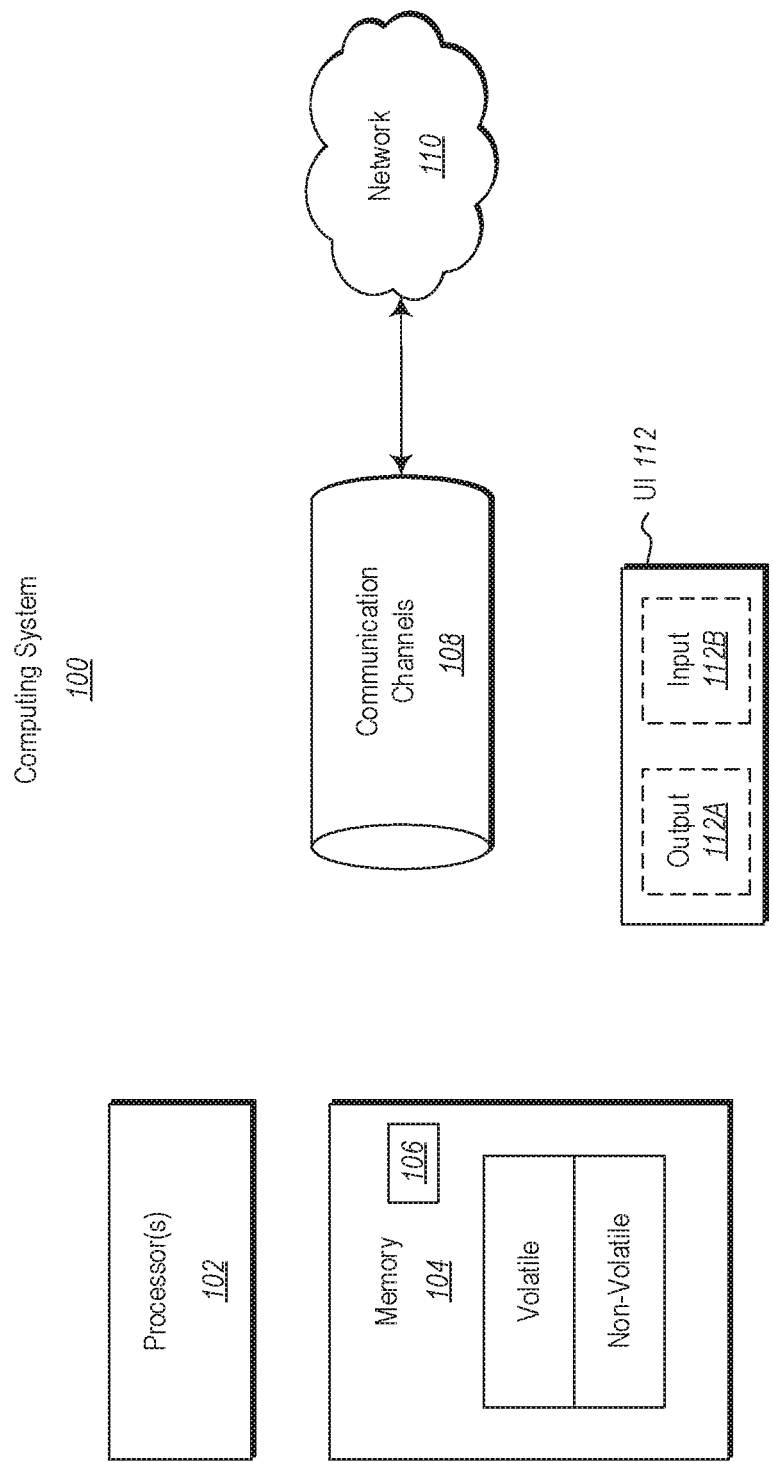
FIG. 1 illustrates an example computing system in which the principles described herein may be employed.

An embodiment disclosed herein is related to computing systems and method for a computing system to generate an access token that includes an IP address from a request. In the embodiment, a request is received for access to one secured data items. The request may include user credentials that specify that a user making the request is permitted to access the secured data items. The user credentials are validated and an Internet Protocol (IP) address that the request was sent from is determined. An access token is generated that includes the IP address that the request was sent from.

An alternative embodiment herein is related to computing systems and method for a computing system to compare an IP address included in an access token to the IP address that the access token was sent from. An access token is received that includes a first Internet Protocol (IP) address. The access token causes the computing system to provide access to secured data items that are stored at the computing system. The first IP address included in the access token is compared with a second IP address that the access token was sent from. Access to the secured data items is provided if the first and second IP addresses match. The access token is rejected, and access is denied if the first and second IP addresses do not match.

The embodiments disclosed herein represent a technical advance over existing systems. For example, the embodiments disclosed herein place the IP address that is used to send a request for an access token in the access token. This IP address can then be checked by the secure server to verify that the IP that is used to send the access token matches the IP address in the token. Since it is very unlikely that a token thief would have the same IP address as the user who sends the request and the access token, additional security is provided. In addition, if those cases where the IP addresses do not match, a feed back system is provided that allows for further verification of the IP addresses as further security. Further, the technical effects related to the disclosed embodiments can also include improved user convenience and efficiency gains.

Because the principles described herein may be performed in the context of a computing system, some introductory discussion of a computing system will be described with respect to FIG. 1. Then, this description will return to the principles of a decentralized identifier (DID) platform with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The processing unit 102 may include a general-purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, virtual or augmented reality, holograms and so forth. Examples of input mechanisms 112B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then be eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 100 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant.

Figure 2A:
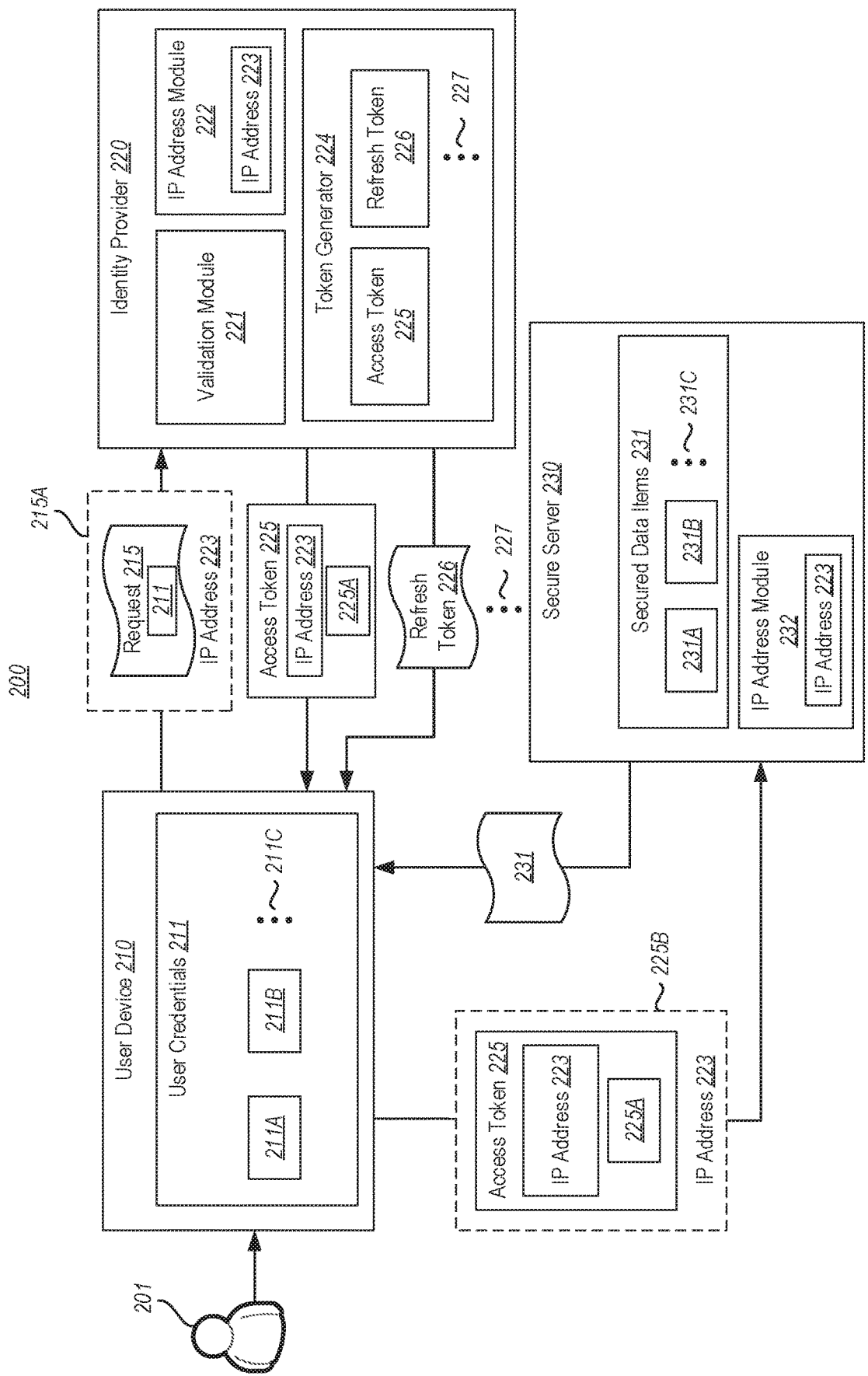
FIG. 2A illustrates an example computing system according to the embodiments disclosed herein.

FIG. 2A illustrates an environment 200 of a computing system according to one embodiment disclosed herein. As illustrated, the environment 200 includes a user device 210 that is associated with a user 201, an identity provider 220, and a secure server 230. In some embodiments, the identity provider 220 and the secure server 230 may be owned by or controlled by the same entity. In other embodiments, the identity provider 220 and the secure server 230 may be owned by or controlled by different entities.

In an embodiment, the user 201 may desire to access one or more secured data items 231 from the secure server 230.

As illustrated, the secure server 230 may store or otherwise have access to a first secured data item 231A, a second secured data item 231B, and any number of additional secured data items as illustrated by the ellipses 231C. For example, the secure server 230 may be an email exchange server and the various secured data items 231 may be emails for the user 201. As will be explained in more detail, the user 201 may utilize the identity provider 220 to obtain an access token that will allow the user 201 to access the desired secured data items 231.

As mentioned, the user device 210 may be associated with or otherwise under the control of the user 201. The user device 210 may be any type of reasonable device such as, but not limited to, a mobile phone, other mobile device, or any type of computer. The user device 210 may store or otherwise have access to user credentials 211. The user credentials 211 may include a first user credential 211A, a second user credential 211B, and any number of additional user credentials as illustrated by the ellipses 211C. The user credentials 211 may be issued to the user 201 by an organization that owns the secured data items 231 to specify that the user 201 is permitted to access the secured data items 231. For example, in the embodiment where the secure server 230 is an email exchange server, the user credentials 211 may be issued to the user 201 by the organization that operates the email exchange server so that the user 201 may access his or her emails. In some embodiments, the user credential 211A may be a username and the user credential 211B may a be password associated with the username. Of course, the user credentials 211 may be any reasonable data that may specify that the user 201 is permitted to access the secured data items 231.

The user device 210 may generate a request 215 for an access token (e.g., access token 225) from the identity provider 220 so that the user 201 may access the secured data items 231. The request 215 may include at least some of the user credentials 211. As illustrated by the dashed line 215A, the request 215 may be associated with an Internet Protocol (IP) address 223, which is the current IP address of the user device 210 that is sending the request 215. In other words, the request 215 will include a header or the like that includes the current IP address 223 of the user device 210 that is used by the network in communicating with the identity provider 220.

The request 215 may be received by the identity provider 220. The identity provider 220 may include a validation module 221. In operation, the validation module 221 may validate that the received user credentials 211 permit the user 201 to access the secured data items 231. For example, in the embodiment where the user credentials 211 include a username and password, the validation module 221 may validate that the username and password are correct and are still valid for accessing the secured data items or alternatively may determine that the username and/or password are not correct and therefore are not to be validated.

The identity provider 220 may also include an IP address module 222. In operation, the IP address module 222 may determine the IP address that the request 215 was sent from. Since the request 215 was sent from the current IP address 223 of the user device 210, the IP address module 222 may determine the IP address 223 as shown in FIG. 2A.

The identity provider 220 may also include a token generator 224. If the validation module 221 validates the user credentials 211, the token generator 224 may generate an access token 225. The access token 225 may include access token information 225A that is configured to cause the secure server 230 to provide access to the secured data items 231. In other words, the access token information 225A may include any data or the like that proves to the secure server 230 that the user 201 should be given access to the secured data items 231. In addition, the token generator 224 may include the IP address that the request 215 was sent from in the access token 225. Accordingly, as illustrated in FIG. 2A, the access token 225 may include the IP address 223.

In some embodiments, the token generator 224 may also generate a refresh token 226 and any number of additional refresh tokens as illustrated by the ellipses 227. As will be explained in more detail to follow, the refresh tokens 226 and 227 may be used to revalidate that the user 201 is still permitted to access the secured data items 231 after the passage of an amount of time. For example, in some embodiments for security reasons, the access token 225 may expire after a predetermined amount of time. In such embodiments, the user device 210 may provide the refresh token 226 to the identity provider 220 to revalidate the user 201, which may lead to the generation of a new access token. In this way, the user 201 does not need to represent the user credentials to the identity provider 220.

The identity provider 220 may then provide the access token 225 to the user device 210. In those embodiments where refresh tokens are also generated, the refresh token 226 and potentially any number of additional refresh tokens 227 may also be provided to the user device 210. The refresh tokens may be provided at the time the access token 225 is provided to the user device 210 or may be provided at a different time as circumstances warrant.

The access token 225 that includes the IP address 223 and the access token information 225A may then be received by the secure server 230 from the user device 210. As represented by the dashed line 225B, the access token 225 may include a header or the like that includes the current IP address 223 of the user device 210 that is used by the network in communicating with the secure server 230.

The secure server 230 may include an IP address module 232. In operation, the IP address module 232 may be configured to compare the IP address that is included in the access token 225 to the IP address that is used to send the access token 225. As discussed previously, in the illustrated embodiment the access token 225 includes the IP address 223 that was placed in the token when it was generated by the identity provider 220. In addition, the access token 225 includes the header or the like that indicates that the access token was sent from the IP address 223.

Accordingly, in the present embodiment, when the IP address module 232 compares the IP addresses 223 included in the access token 225 and the IP address 223 used to send the access token, it may determine that the IP addresses match. In response to determining that the IP addresses match, the secure server 230 may provide access to at least some of the secured data items 231. For example, as illustrated in FIG. 2A the secure server 230 may provide at least some of the secured data items to the user device 210, where they may be accessed by the user 201.

Advantageously, including the IP address 223 in the access token 225 provides additional security to the process of providing access to the secured data items 231. For example, since the IP address included in the access token must match the IP address that sent the access token, there is added protection against the theft of the access token because it is unlikely that a token thief would have the same IP address as the device that sent the request 215 to the identity provider.

Figure 2B:
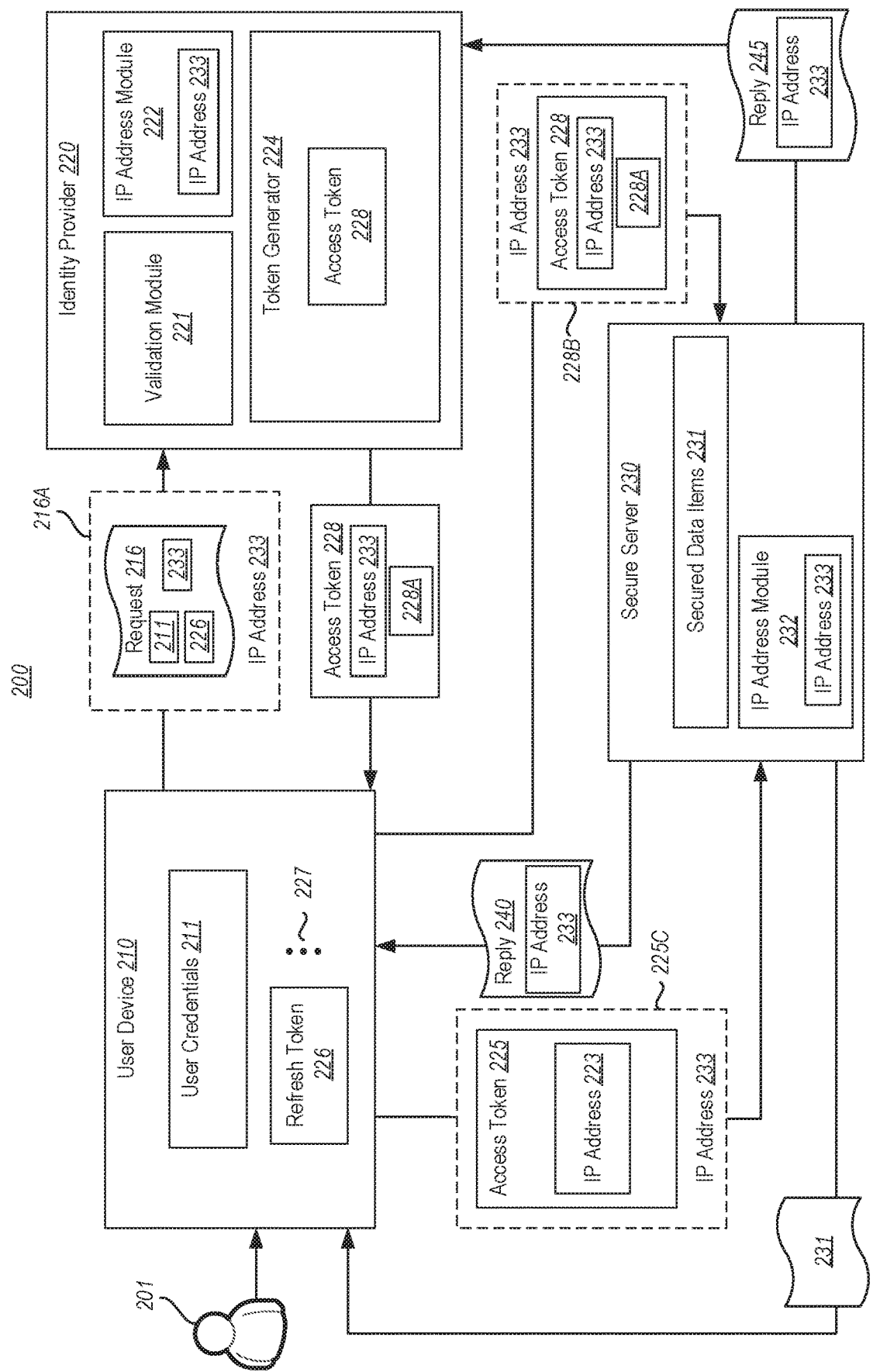
FIG. 2B illustrates another example computing system according to the embodiments disclosed herein.

FIG. 2B illustrates an alternative view of the environment 200 of the computing system according to another embodiment disclosed herein. It will be noted that for ease of explanation, the description of FIG. 2B may not include a description of the elements already discussed in relation to FIG. 2A. In addition, FIG. 2B may omit some of the elements shown in FIG. 2A, although such elements may still be considered part of the embodiment of environment 200 illustrated in FIG. 2B.

As illustrated, the access token 225 that includes the IP address 223 and the access token information 225A previously discussed may be received by the secure server 230 from the user device 210. However, in contrast to FIG. 2A, the access token 225 may include a header or the like represented by the dashed line 225C that includes a different current IP address 233 of the user device 210 that is used by the network in communicating with the secure server 230. The different IP address 233 may be caused by the fact that the user device 210 is using a different IP address. For example, the provider of IP address 223 may have gone down after the user device 210 received the access token 225 from the identity provider but before the access token was provided to the secure server 230, thus causing the user device 210 to use a different provider for the IP address 233 when providing the access token 225 to the secure server 230.

As mentioned previously, once the access token 225 is received, the IP address module 232 may compare the IP address that is included in the access token 225 to the IP address that is used to send the access token 225. In the embodiment of FIG. 2B, the IP address 223 included in the access token 225 does not match the IP address 233 used to send the access token. Accordingly, the secure server 230 will reject the access token 225 and deny access to the secured data items 231. As mentioned above, this helps guard against use of a stolen access token 225 as the access token will be rejected if a token thief is attempting to send the stolen access token from an IP address that is different from the IP address used by the user device 210.

In response to rejecting the access token 225 and denying access to the secured data items 231, the secure server 230 may generate a reply 240 that informs the user device 210 of the rejection. In some embodiments, the replay 240 may include the IP address 233. In alternative embodiments the secure server may generate a reply 245 that include the IP address 233 and that may be provided to the identity provider 220.

Upon receiving the reply 240, the user device 210 may generate a new request 216 for access to the secured data items 231. The request 216 may include either the user credentials 211 or it may include the refresh token 226, both of which are shown as part of the request in FIG. 2B for ease of illustration although typically only one or the other will be included in the request. In those embodiments where the replay 240 includes the IP address 233, the request 216 may also include the IP address 233. As represented by the dashed line 216A, the request 216 may include a header or the like that includes the current IP address 233 of the user device 210 that is used by the network in communicating with the identity provider 220. It will be noted that including the IP address 233 in the request 216 or by generating the reply 245, the secure server 230 is able to communicate to the identity provider 220 in a secured manner the IP address that was used to send the access token 225.

The request 216 may be received by the identity provider 220. In the embodiments where the request 216 includes the user credentials 211, the validation module 221 may revalidate that the user credentials 211 permit the user 201 to access the secured data items 231. For example, the user 201 may need to enter his or her username or password. Alternatively, in the embodiments where the request 216 includes the refresh token 226 (or any of the refresh tokens 227), the validation module may automatically revalidate that the user 201 is still permitted to access the secured data items 231 since the user 201 has been issued the refresh tokens. Thus, use of the refresh tokens in the request 216 removes the need for the user 201 to take any action as the user device 210 may provide the refresh token in the request 216 without any user 201 input.

The token generator 224 may then generate a new access token 228 that includes the IP address 233 that the request 216 was sent from and that is the same as the IP address 233 included in the reply 240 or 245. The new access token 228 may also include access token information 228A (which may correspond to access token information 225A) in the manner previously described for access token 225. The access token 228 may then be provided to the user device 210. It will be noted that the presence of the refresh token 226 or the fact that the user credentials 211 are able to be revalidated shows that the original access token 225 was not stolen by token thief.

The access token 228 may then be received by the secure server 230. Upon receipt of the access token 228, the IP address module 232 may compare the IP address that is included in the access token 228 to the IP address that is used to send the access token 228. In the illustrated embodiment of FIG. 2B, the access token 228 includes the IP address 233 that was placed in the access token 228 when it was generated by the identity provider 220. In addition, as represented by the dashed lines 228B the access token 228 includes a header or the like that indicates that the access token 228 was sent from the IP address 233.

Accordingly, in the embodiment of FIG. 2B, when the IP address module 232 compares the IP addresses 233 included in the access token 228 and the IP address 233 used to send the access token, it may determine that the IP addresses match. In response to determining that the IP addresses match, the secure server 230 may provide access to at least some of the secured data items 231. For example, as illustrated in FIG. 2B the secure server 230 may provide at least some of the secured data items to the user device 210, where they may be accessed by the user 201.

It will be noted that if the IP address included in the access token 228 and the IP address that was used to send the access token 228 did not match, then the access token 228 would be rejected by the secure server 230 and access to the secured data items 231 would be denied. In such case, the secure server 230 could generate a new reply and the process could be repeated.

Figure 2C:
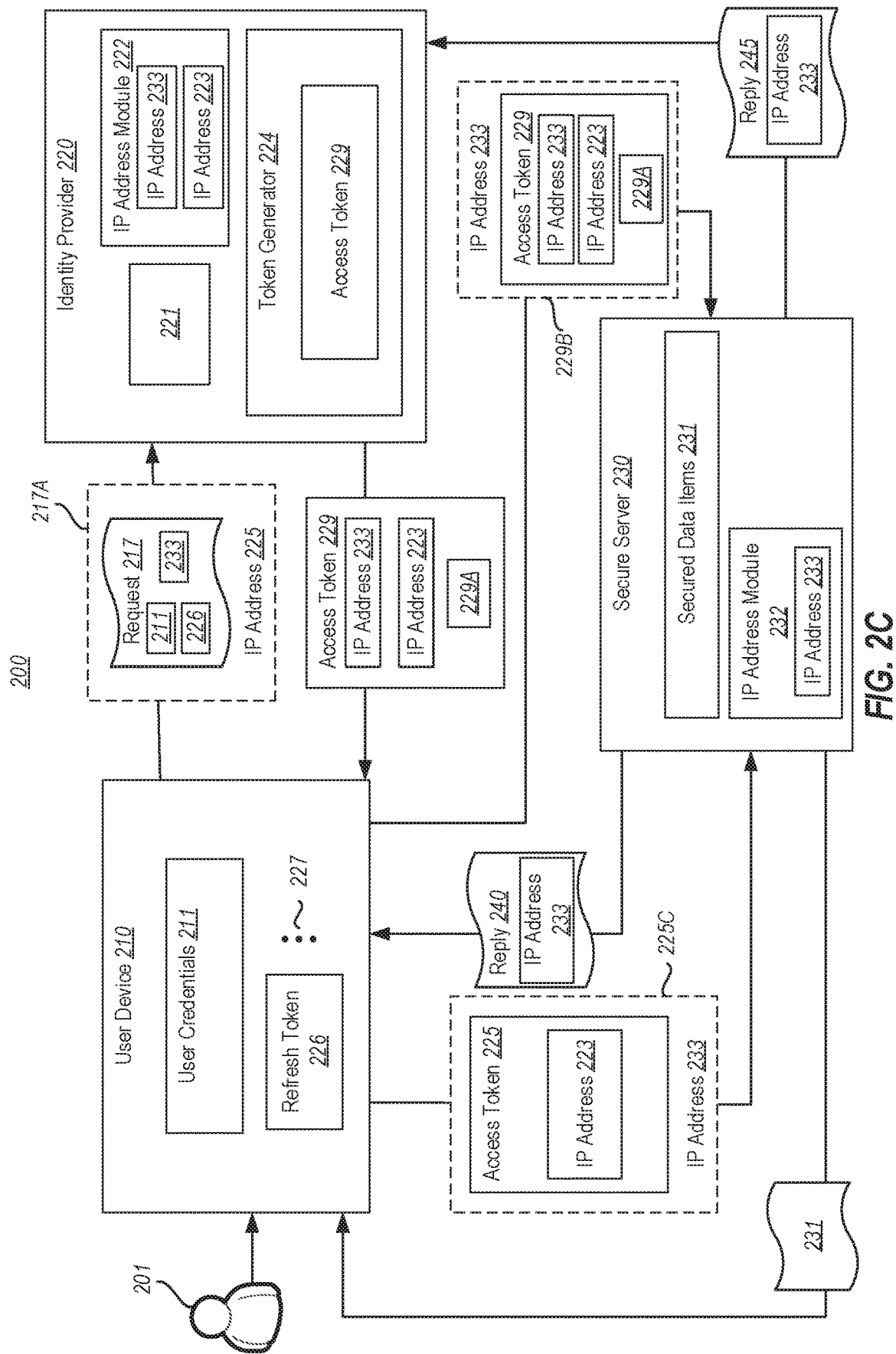
FIG. 2C illustrates another example computing system according to the embodiments disclosed herein.

FIG. 2C illustrates a further alternative view of the environment 200 of the computing system according to a further embodiment disclosed herein. It will be noted that for ease of explanation, the description of FIG. 2C may not include a description of the elements already discussed in relation to FIGS. 2A and 2B. In addition, FIG. 2C may omit some of the elements shown in FIGS. 2A and 2B, although such elements may still be considered part of the embodiment of the environment 200 illustrated in FIG. 2C.

As illustrated, in the embodiment of FIG. 2C, the access token 225 may be rejected by the secure server 230 because the IP address in the token does not match the IP address the access token was sent from and the replies 240 and 245 may be generated and provided to the user device 210 and the identity provider 220 in the manner previously described. In response to receiving the reply 240, the user device 210 may generate a new request 217 for access to the secured data items 231. The request 217 may include either the user credentials 211 or it may include the refresh token 226, both of which are shown as part of the request in FIG. 2C for ease of illustration although typically only one or the other will be included in the request. As represented by the dashed line 217A, the request 217 may include a header or the like that includes the current IP address of the user device 210, which in this embodiment is the IP address 225 that was used to send the original request 215.

The request 217 may be received by the identity provider 220 and the validation module 221 may revalidate the user 201 using either the included user credentials 211 or the refresh token 226. Since the request included the user credentials or the refresh token, the identity provider 220 may be confident that that it is the user device 210 making the request 217.

The IP address module 222 may then determine if the IP address included in the reply 240 or 245 and the IP address used to send the request 217 are the same. In the embodiment of FIG. 2C, the IP address module 222 may determine that they are not the same. Since the IP address module 222 has been informed by the secure server that the IP address 233 is being used to send the access token 225 to the secure server, the IP address module 222 may determine that proxy partitioning may be occurring. For example, the user device 210 may be using IPv4 to communicate with the identity provider and using IPv6 to communicate with the secure server 230. Accordingly, while the user device 210 may appear to have two different IP addresses, there is a legitimate reason that the IP address included in the reply 245 and the IP address used to send the request 217 are not the same.

Accordingly, the token generator 224 may generate a new access token 229 that includes both the IP address 223 and the IP address 233 as well as access token information 229A (which may correspond to access token information 225A). The access token 229 may be provided to the user device 210.

The access token 229 may then be received by the secure server 230. Upon receipt of the access token 229, the IP address module 232 may compare the IP address that is included in the access token 229 to the IP address that is used to send the access token 229. In the illustrated embodiment of FIG. 2C, the access token 229 includes the IP address 233 that was placed in the access token 229 when it was generated by the identity provider 220. In addition, as represented by the dashed lines 229B the access token 229 includes a header or the like that indicates that the access token 228 was sent from the IP address 233.

Accordingly, in the embodiment of FIG. 2C, when the IP address module 232 compares the IP addresses 233 included in the access token 229 and the IP address 233 used to send the access token, it may determine that the IP addresses match. In response to determining that the IP addresses match, the secure server 230 may provide access to at least some of the secured data items 231. For example, as illustrated in FIG. 2C the secure server 230 may provide at least some of the secured data items to the user device 210, where they may be accessed by the user 201. Since both the IP address 223 and IP address 233 are included in the access token 229, there should be no need to repeat the process as the IP address used to send the access token 229 should always be included in the access token.

Figure 2D:
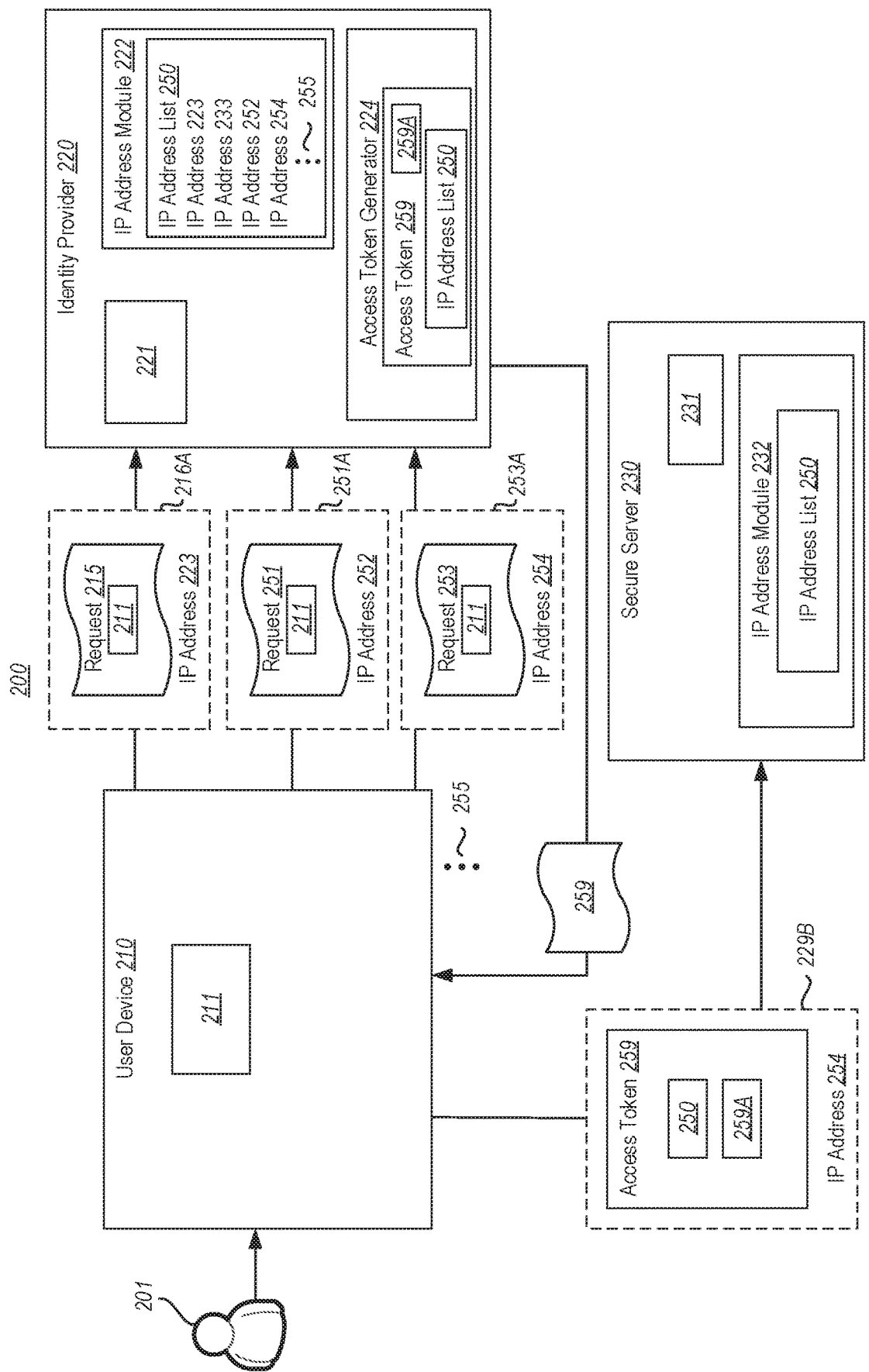
FIG. 2D illustrates another example computing system according to the embodiments disclosed herein.

FIG. 2D illustrates a further alternative view of the environment 200 of the computing system according to a further embodiment disclosed herein. It will be noted that for ease of explanation, the description of FIG. 2D may not include a description of the elements already discussed in relation to FIGS. 2A, 2B and 2C. In addition, FIG. 2D may omit some of the elements shown in FIGS. 2A, 2B and 2C, although such elements may still be considered part of the embodiment of the environment 200 illustrated in FIG. 2D.

As shown in FIG. 2D, the user device 210 may make several requests for access to the secured data items 231 using different IP addresses. For example, the user device 210 may make the request 215 previously discussed using the IP address 223 as represented by the dashed lines 215A. At another time, the user may be at his or her home and so the user device 210 may make a request 251 using an IP address 252 as represented by the dashed lines 251A. At still another time, the user 201 may be in a different location and so the user device 210 may make a request 253 using an IP address 254 as represented by the dashed lines 253A. The ellipses 255 illustrate that there may be any number of additional IP addresses used to send a request.

In this embodiment, the IP address module 222 may generate an IP address list 250 of the various IP addresses that are used by the user device 210 to make a request. As illustrated, the IP address list 250 may include the IP address 223, the IP address 233 previously discussed, the IP address 252, the IP address 254, and potentially any number of additional IP addresses as illustrated by the ellipses 255. In one embodiment, the IP address list 250 may be generated and updated in real time by the IP address module 222 as the user device 210 utilizes additional IP addresses when sending a request to the identity provider 210. In another embodiment, a list of IP addresses likely to used by the user device 210 may be provided to the identity provider 220 and then added to or used to generate the IP address list 250. Since the validation module 221 would have validated each of the requests using the user credentials 211 (or perhaps a refresh token), there is little risk that an IP address from a token thief would end up in the IP address list 250.

The token generator 224 may then generate an access token 259 that may include access token information 259A, which may correspond to the access token information 225A. Rather than include a single IP address in the access token 259, the entire IP address list 250 may be included in the access token. The access token 259 may then be provided to the user device 210.

The access token 259 may then be received by the secure server 230. As illustrated in FIG. 2D, the access token 259 may be sent using the IP address 254. Since the IP address 254 is included in the IP address list 250, when the IP address module 232 compares the IP addresses 254 with the IP address list 250, it may determine that the IP addresses match. Accordingly, the secure server 230 may allow access to the secured data items 231.

Advantageously, use of the IP address list 250 allows the IP addresses used or likely to be used by the user device 210 to be included in an access token. This will help to ensure that the access token is accepted by the secure server 230 so that access to the secured data items 231 may be allowed without the need for the secure server to provide the replies 240 and 245 to obtain an updated access token. This is turn may reduce the operating time and the computing resources needed to provide access to the secured data items 231.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
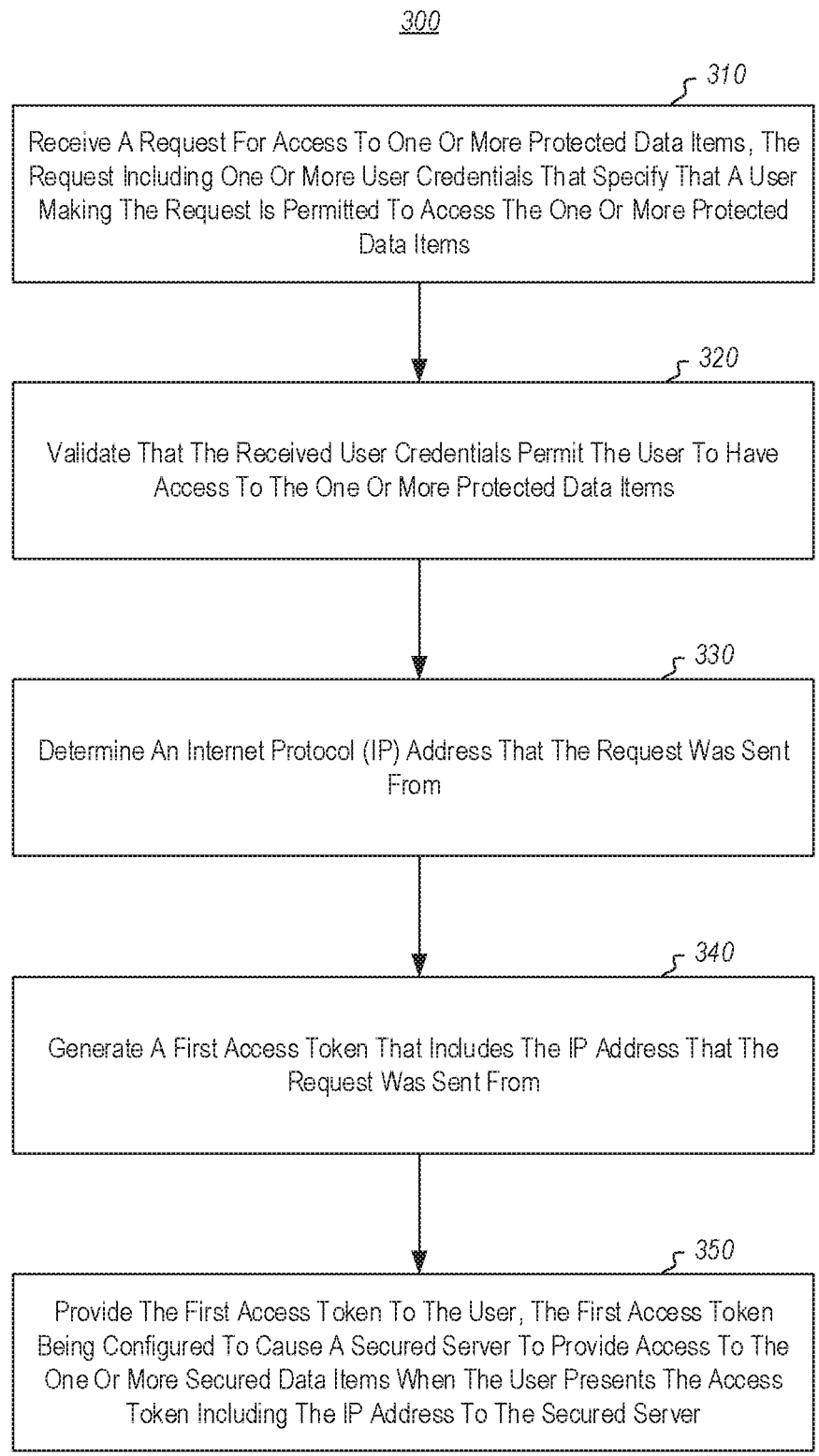
FIG. 3 illustrates a flowchart of a method for a computing system to generate an access token that includes an IP address from a request.

FIG. 3 illustrates a flow chart of an example method 300 for a computing system to generate an access token that includes an IP address from a request. The method 300 will be described with respect to one or more of FIGS. 2A-2D discussed previously.

The method 300 includes receiving a request for access to one or more secured data items (310). The request includes one or more user credentials that specify that a user making the request is permitted to access the one or more secured data items. For example, as previously discussed the identity provider 220 may receive the request 215 (or perhaps the requests 251 or 253) for access to the secured data items 231. The request may include the user credentials 211, such as a password and username, that specify that the user 201 is permitted to access the secured data items 231.

The method 300 includes validating that the received user credentials permit the user to have access to the one or more secured data items (320). For example, as previously discussed the validation module 221 may validate the user credentials 211.

The method 300 includes determining an Internet Protocol (IP) address that the request was sent from (330). For example, as previously discussed the IP address module 222 may determine the IP address, for instance IP address 223, that was used to send the request 215.

The method 300 may include generating a first access token that includes the IP address that the request was sent from (340). For example, as previously discussed the access token generator 224 may generate the access token 225. The access token 225 may include the IP address 223 that the request 215 was sent from.

The method 300 may include providing the first access token to the user (350). The first access token may be configured to cause a secured server to provide access to the one or more secured data items when the user presents the access token including the IP address to the secured server. For example, as previously discussed the identity provider 220 may provide the access token 225 to the user device 210. The user device may then present the access token to the secure server 230 to gain access to the secured data items 231.

Figure 4:
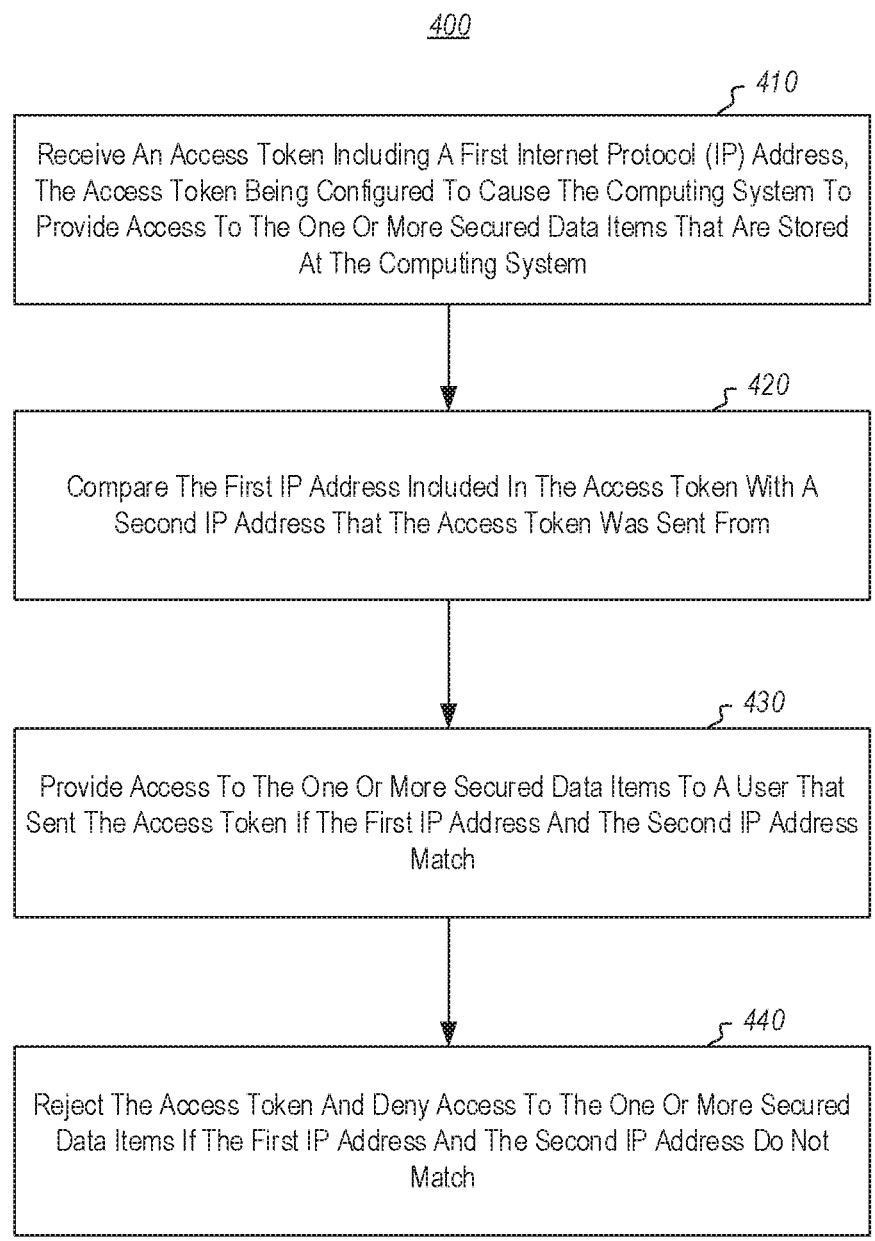

FIG. 4 illustrates a flow chart of an example method 400 for a computing system to compare an IP address included in an access token to the IP address that the access token was sent from. The method 400 will be described with respect to one or more of FIGS. 2A-2D discussed previously.

The method 400 includes receiving an access token including a first Internet Protocol (IP) address (410). The access token may be configured to cause the computing system to provide access to the one or more secured data items that are stored at the computing system. For example, as previously discussed the secure server 230 may receive the access token 225 that includes the IP address 223.

The method 400 includes comparing the first IP address included in the access token with a second IP address that the access token was sent from (420). For example, as previously discussed the IP address module 232 may compare the IP address 223 included in the access token 225 with the IP address that the access token was sent from.

The method 400 includes providing access to the one or more secured data items to a user that sent the access token if the first IP address and the second IP address match (430). For example, as previously discussed in relation to FIG. 2A, the IP address 223 included in the access token 225 matches the IP address 223 represented by the dashed lines 225B that was used to send the access token. Accordingly, the secure server may provide access to the secured data items 230 to the user 201.

The method 400 includes rejecting the access token and denying access to the one or more secured data items if the first IP address and the second IP address do not match (440). For example, as previously discussed in relation to FIGS. 2B and 2C, the IP address 223 included in the access token 225 does not match the IP address 233 represented by the dashed line 225C that was used to send the access token. Accordingly, the secure server 230 may reject the access token 225 and deny access to the secured data items 230 to the user 201.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable hardware storage devices that store instructions that are executable by the one or more processors to cause the computing system to:
receive a request for access to one or more secured data items, the request including one or more user credentials that specify that a user making the request is permitted to access the one or more secured data items;
validate that the received user credentials permit the user to have access to the one or more secured data items;
determine an IP address that the request was sent from;
generate a list of IP addresses, wherein:
the list of IP addresses includes the determined IP address that the request was sent from,
the list of IP addresses additionally includes IP addresses that have been previously used by the user to submit access requests, and
the list of IP addresses additionally includes IP addresses that have not been used previously by the user to submit access requests but that are determined may likely be used later by the user to submit access requests;
generate a first access token, wherein generating the first access token includes adding the list of IP addresses into the first access token; and
provide the first access token to the user, the first access token being configured to cause a secured server to provide access to the one or more secured data items when the user presents the access token, which includes the list of IP addresses, to the secured server.

2. The computing system of claim 1, wherein the executed computer-executable instructions further cause the computing system to:

generate one or more refresh tokens that are configured to revalidate that the user is still permitted to access the one or more secured data items; and provide the one or more refresh tokens to the user at a time when the access token is provided to the user.

3. The computing system of claim 1, wherein the executed computer-executable instructions further cause the computing system to:

receive a second request for access to the one or more secured data items from the user, the second request including a refresh token that was previously issued to the user;

revalidate that the user is still permitted to access the one or more secured data items using the refresh token;

generate a second access token that includes both the IP address that was included in the first access token and a second IP address that was used to provide the access token to the secured server; and provide the second access token to the user.

4. The computing system of claim 1, wherein the executed computer-executable instructions further cause the computing system to:

receive a second request for access to the one or more secured data items from the user, the second request including the one or more user credentials;

revalidate that the user is still permitted to access the one or more secured data items using the one or more user credentials;

generate a second access token that includes both the IP address that was included in the first access token and a second IP address that was used to provide the access token to the secured server; and provide the second access token to the user.

5. The computing system of claim 1, wherein the executed computer-executable instructions further cause the computing system to:

receive a second request for access to the one or more secured data items from the user, the second request including a refresh token that was previously issued to the user;

revalidate that the user is still permitted to access the one or more secured data items using the refresh token;

generate a second access token that includes a third IP address that was used to send the second request that is the same as a second IP address that was used to provide the access token to the secured server; and provide the second access token to the user.

6. The computing system of claim 1, wherein the executed computer-executable instructions further cause the computing system to:

receive a second request for access to the one or more secured data items from the user, the second request including the one or more user credentials;

revalidate that the user is still permitted to access the one or more secured data items using the refresh token;

generate a second access token that includes a third IP address that was used to send the second request that is the same as a second IP address that was used to provide the access token to the secured server; and provide the second access token to the user.

7. The computing system of claim 1, wherein the one or more user credentials comprise one or more of a username and password.

8. A computing system comprising:
one or more processors; and
one or more computer-readable hardware storage devices that store instructions that are executable by the one or more processors to cause the computing system to:
receive an access token that includes a list of Internet Protocol (IP) addresses, the access token being configured to cause the computing system to provide access to one or more secured data items that are stored at the computing system, wherein:
the list of IP addresses includes a first IP address,
the list of IP addresses additionally includes IP addresses that have been previously used by a user to submit access requests, and
the list of IP addresses additionally includes IP addresses that have not been used previously by the user to submit access requests but that are determined may likely be used later by the user to submit access requests;
compare the first IP address included in the access token with a second IP address that the access token was sent from;
provide access to the one or more secured data items to the user that sent the access token if the first IP address and the second IP address match; and
reject the access token and deny access to the one or more secured data items if the first IP address and the second IP address do not match.

9. The computing system of claim 8, wherein the executed computer-executable instructions further cause the computing system to:
in response to rejecting the access token, generate a reply that includes the second IP address that the access token was sent from.

10. The computing system of claim 9, wherein the executed computer-executable instructions further cause the computing system to:
receive a second access token, the second access token including the second IP address, wherein the second IP address matches the IP address used to send the second access token; and
provide access to the one or more secured data items.

11. The computing system of claim 9, wherein the executed computer-executable instructions further cause the computing system to:
receive a second access token, the second access token including both the first and the second IP address, wherein one of the first or second IP addresses matches the IP address used to send the second access token; and
provide access to the one or more secured data items.

12. A method for a computing system to generate an access token that includes an Internet Protocol (IP) address from a request, the method comprising:
receiving a request for access to one or more secured data items, the request including one or more user credentials that specify that a user making the request is permitted to access the one or more secured data items;
validating that the received user credentials permit the user to have access to the one or more secured data items;
determining an IP address that the request was sent from;
generating a list of IP addresses, wherein:
the list of IP addresses includes the determined IP address that the request was sent from,
the list of IP addresses additionally includes IP addresses that have been previously used by the user to submit access requests, and the list of IP addresses additionally includes IP addresses that have not been used previously by the user to submit access requests but that are determined may likely be used later by the user to submit access requests;

generating a first access token, wherein generating the first access token includes adding the list of IP addresses into the first access token; and providing the first access token to the user, the first access token being configured to cause a secured server to provide access to the one or more secured data items when the user presents the access token, which includes the list of IP addresses, to the secured server.

13. The method according to claim 12, further comprising:

generating one or more refresh tokens that are configured to revalidate that the user is still permitted to access the one or more secured data items; and providing the one or more refresh tokens to the user at the time the access token is provided to the user.

14. The method according to claim 12, further comprising:

receiving a second request for access to the one or more secured data items from the user, the second request including a refresh token that was previously issued to the user;

revalidating that the user is still permitted to access the one or more secured data items using the refresh token;

generating a second access token that includes both the IP address that was included in the first access token and a second IP address that was used to provide the access token to the secured server; and providing the second access token to the user.

15. The method according to claim 12, further comprising:

receiving a second request for access to the one or more secured data items from the user, the second request including the one or more user credentials;

revalidating that the user is still permitted to access the one or more secured data items using the refresh token;

generating a second access token that includes both the IP address that was included in the first access token and a second IP address that was used to provide the access token to the secured server; and providing the second access token to the user.

16. The method according to claim 12, further comprising:

receiving a second request for access to the one or more secured data items from the user, the second request including a refresh token that was previously issued to the user;

revalidating that the user is still permitted to access the one or more secured data items using the refresh token;

generating a second access token that includes a third IP address that was used to send the second request that is the same as a second IP address that was used to provide the access token to the secured server; and providing the second access token to the user.

17. The method according to claim 12, further comprising:

receiving a second request for access to the one or more secured data items from the user, the second request including the one or more user credentials;

revalidating that the user is still permitted to access the one or more secured data items using the refresh token;

generating a second access token that includes a third IP address that was used to send the second request that is the same as a second IP address that was used to provide the access token to the secured server; and providing the second access token to the user.

* * * * *